United States Patent
Park (10) Patent No.: US 9,485,072 B2
(45) Date of Patent: *Nov. 1, 2016

(54) METHOD OF TRANSMITTING AND RECEIVING ACK/NACK SIGNAL AND APPARATUS THEREOF

(71) Applicant: Pantech Co., Ltd., Seoul (KR)

(72) Inventor: Dong Hyun Park, Seoul (KR)

(73) Assignee: Pantech Co., Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/992,186

(22) Filed: Jan. 11, 2016

(65) Prior Publication Data

US 2016/0127105 A1    May 5, 2016

Related U.S. Application Data

(63) Continuation of application No. 13/877,827, filed as application No. PCT/KR2011/007659 on Oct. 14, 2011, now Pat. No. 9,237,566.

(30) Foreign Application Priority Data

Oct. 15, 2010  (KR) .................. 10-2010-0100988

(51) Int. Cl.
*H04W 4/00* (2009.01)
*H04L 5/00* (2006.01)
(Continued)

(52) U.S. Cl.
CPC ............ *H04L 5/0055* (2013.01); *H04L 1/1861* (2013.01); *H04L 5/001* (2013.01); *H04W 72/042* (2013.01); *H04L 1/0026* (2013.01); *H04L 5/0057* (2013.01); *H04W 72/04* (2013.01)

(58) Field of Classification Search
None
See application file for complete search history.

(56) References Cited

U.S. PATENT DOCUMENTS

2011/0235599 A1*  9/2011  Nam .................. H04L 1/0027
                                                  370/329
2011/0243066 A1* 10/2011  Nayeb Nazar ........ H04L 1/007
                                                  370/328
2012/0263121 A1* 10/2012  Chen .................. H04L 1/1607
                                                  370/329

FOREIGN PATENT DOCUMENTS

| CN | 10-1542958 | 9/2009 |
|---|---|---|
| JP | 2012-95288 | 5/2012 |
| WO | 2008/055222 | 5/2008 |

OTHER PUBLICATIONS

Samsung, "PUCCH HARQ-ACK Resource Mapping for DL CA", 3GPP TSG RAN WG1 #61bis, R1-103637, Jun. 28-Jul. 2, 2010, Dresden, Germany.

(Continued)

*Primary Examiner* — Edan Orgad
*Assistant Examiner* — Sithu Ko
(74) *Attorney, Agent, or Firm* — H.C. Park & Associates, PLC (57) ABSTRACT

Disclosed is a method for transmitting an ACK/NACK signal for an HARQ (Hybrid Automatic Repeat reQuest) in a CA (Carrier Aggregation) system, the method including obtaining at least one transmission resource among first and second transmission resources; configuring a first table showing a relationship in which a combination of at least one of the first and second transmission resources and modulation symbols is mapped to an ACK/NACK signal, and transmitting modulation symbols corresponding to a transmission target ACK/NACK signal in the first table by using transmission resource corresponding to the transmission target ACK/NACK signal in the first table.

18 Claims, 6 Drawing Sheets

(51) Int. Cl.
*H04L 1/18* (2006.01)
*H04L 1/00* (2006.01)
*H04W 72/04* (2009.01)

(56) References Cited

OTHER PUBLICATIONS

Fujitsu, "Channel Selection for A/N feedback in CA", 3GPP TSG RAN #62, R1-104875, Aug. 23-27, 2010, Madrid, Spain.
Huawei, "Resource allocation for uplink ACK/NACK multiplexing", 3GPP TSG RAN WG1 #62, R1-104282, Aug. 23-27, 2010, Madrid, Spain.
CATT, "ACK/NACK resource allocation for CA", 3GPP TSG RAN WG1 #62, R1-104312, Aug. 23-27, 2010, Madrid, Spain.
International Search Report of International Application No. PCT/KR2011/007659 mailed on Mar. 21, 2012.
Huawei, "UL ACK/NACK feedback related DCI design for carrier aggregation" in 3GPP TSG RAN WG1 Meeting #60bis, R1-101943, Apr. 12-16, 2010, Beijing, China.
Non Final Office Action issued on Dec. 1, 2014, in U.S. Appl. No. 13/877,827.
Office Action issued by Chinese Patent Office on Dec. 25, 2014 in Chinese Patent Application No. 201180049399.7.
Pantech, "PUCCH resource allocation with SORTD for channel selection", 3GPP TSG RAN1 #63, R1-106054, Nov. 15-19, 2010, Jacksonville, USA.
Final Office Action issued on May 15, 2015, in U.S. Appl. No. 13/877,827.
Notice of Allowance issued on Sep. 3, 2015, in U.S. Appl. No. 13/877,827.

\* cited by examiner

METHOD OF TRANSMITTING AND RECEIVING ACK/NACK SIGNAL AND APPARATUS THEREOF

CROSS-REFERENCE TO RELATED APPLICATIONS

This application is a continuation of U.S. patent application Ser. No. 13/877,827, filed on Apr. 4, 2013, which is the National Stage Entry of International Application No. PCT/KR2011/007659, filed on Oct. 14, 2011, and claims priority to and the benefit of Korean Patent Application No. 10-2010-0100988, filed on Oct. 15, 2010, all of which are hereby incorporated by reference for all purposes as if fully set forth herein.

BACKGROUND

1. Field

The present invention relates to wireless communication and, more particularly, to a wireless communication system supporting multiple carriers.

2. Discussion of the Background

A wireless communication system generally uses a single bandwidth for data transmission, and respective mobile communication generation use different bandwidths. For example, a $2^{nd}$-generation wireless communication system uses a bandwidth of 200 KHz to 1.25 MHz, a $3^{rd}$-wireless communication system uses a bandwidth of 5 MHz to 10 MHz. In order to support an increasing transmission capacity, recently, LTE (Long Term Evolution) or IEEE 802.16m continue to extend their bandwidth to 20 MHz or even higher. It may be requisite to increase the bandwidth to enhance transmission capacity, but it is not easy to allocate frequency of a large bandwidth, except for some areas globally.

A carrier aggregation (CA) technique for binding (or grouping) a plurality of physically non-continuous bands in a frequency domain to obtain an effect of using a logically large band has been developed in order to effectively use fragmented small bands. Individual unit carriers bound through carrier aggregation are called component carriers (CCs). Each of the component carriers (CCs) is defined by a single bandwidth and central frequency.

A system for transmitting and/or receiving data in a broadband through a plurality of component carriers is called a CA (Carrier Aggregation) system or a carrier aggregation environment. The CA system supports both a narrowband and a broadband by using one or more carriers. For example, when one carrier corresponds to a bandwidth of 5 MHz, a bandwidth of a maximum of 20 MHz is supported by using four carriers.

In order to operate the CA system, various control signaling is required between a base station (BS) and a user equipment (UE). For example, exchanging of ACK (ACKnowledgement)/NACK (Not-ACKnowledgement) information to perform HARQ (Hybrid Automatic Repeat reQuest), exchanging of CQI (Channel Quality Indicator) indicating downlink channel quality, and the like, are required.

In this connection, however, since a plurality of uplink CCs and a plurality of downlink CCs are used in the multi-CC system, an apparatus and method for exchanging various control signaling between a BS and a UE in such a communication environment are required.

SUMMARY

Therefore, an object of the present invention is to provide an apparatus and method for effectively allocating transmission resources for transmitting an ACK/NACK signal with respect to a plurality of component carriers (CCs) in a CA system.

Another object of the present invention is to provide an apparatus and method for effectively using radio resources by using resources allocated for repeatedly transferred control signals in a CA system.

Another object of the present invention is to provide a resource allocation method for preventing a collision of radio resources and smoothly performing communication in a CA system.

According to an aspect of the present invention, there is provided a method for transmitting an ACK/NACK signal for an HARQ (Hybrid Automatic Repeat reQuest) in a CA system, including: obtaining at least one transmission resource through a resource allocation indicator transmitted on a downlink control channel; and obtaining at least one second transmission resource based on at least one of resources used for the downlink control channel, wherein the transmission of the ACK/NACK signal is performed through a transmission and a modulation symbol mapped by a first table comprised of combinations of the obtained first and/or second transmission resources and modulation symbols of the ACK/NACK signal.

The number of first and/or second transmission resources may be allocated according to the number of transmission bits of the ACK/NACK signal.

The resource allocation indicator may be transferred by using resource allocated to control information repeatedly transmitted through a plurality of CCs.

The first transmission resource may be a transmission resource mapped by a resource allocation indicator on a second table comprised of a certain transmission resource group.

The transmission of the ACK/NACK signal may be performed through a multi-antenna system, and the method may further include obtaining a third transmission resource different from the first and second transmission resources, wherein a transmission resource mapped in the first table may be allocated to a first antenna, a third transmission resource may be allocated to a second antenna, and modulation symbols mapped in the first table may be transmitted through the first and second antennas.

According to another aspect of the present invention, there is provided a method for receiving an ACK/NACK signal for an HARQ (Hybrid Automatic Repeat reQuest) in a CA system, including: allocating at least one first transmission resource to be used for transmission of an uplink ACK/NACK signal through a resource allocation indicator transmitted on a downlink control channel; and transmitting a resource allocation indicator on a downlink control channel, wherein the resource allocation indicator may indicate a transmission resource to be used for transmission of the ACK/NACK signal in a table comprised of a certain transmission resource group.

The resource allocation indicator may be transferred by using resource allocated to control information repeatedly transmitted through a plurality of CCs.

According to another aspect of the present invention, there is provided an apparatus for transmitting an ACK/NACK signal for an HARQ (Hybrid Automatic Repeat reQuest) in a CA system, including: an RF unit receiving a downlink transport block through a downlink allocation indicated by a downlink control channel and transmitting an ACK/NACK signal with respect to the downlink transport block; and a signal processing unit processing a signal received from the RF unit and a signal transmitted via the RF unit, wherein the signal processing unit obtains at least one first transmission resource through a resource allocation indicator transmitted on the downlink control channel, obtains at least one second transmission resource based on at least one of resources used for the downlink control channel, and maps modulation symbols and a transmission resource to be used for transmission of the ACK/NACK in a table comprised of combinations of first and/or second transmission resources and modulation symbols of ACK/NACK transmission, and the RF unit transmits an ACK/NACK signal by using the mapped transmission resource and modulation symbols.

The RF unit may include a plurality of antennas, a transmission resource mapped in the table may be allocated to a first antenna among the plurality of antennas, a transmission resource different from the first and second transmission resources may be allocated to a second antenna among the plurality of antennas, and symbols mapped in the table may be transmitted through the first and second antennas.

According to another aspect of the present invention, there is provided an apparatus for receiving an ACK/NACK signal for an HARQ (Hybrid Automatic Repeat reQuest) in a CA system, including: an RF unit transmitting a downlink transport block through a downlink allocation indicated by a downlink control channel and receiving an ACK/NACK signal with respect to the downlink transport block; and a signal processing unit processing a signal transmitted from the RF unit and a signal received through the RF unit, wherein the signal processing unit allocates at least one transmission resource to be used for transmission of an ACK/NACK signal through a resource allocation indicator transmitted on the downlink control channel, the RF unit transmits a resource allocation indicator on the downlink control channel, and the resource allocation indicator indicates a transmission resource to be used for transmission of the ACK/NACK signal in a table comprised of a certain transmission resource group.

According to another aspect of the present invention, there is provided a method for transmitting an ACK/NACK signal for an HARQ (Hybrid Automatic Repeat reQuest) by a user equipment (UE) in a CA system, including: obtaining at least one transmission resource among first and second transmission resources; and transmitting modulation symbols corresponding to a transmission target ACK/NACK signal in a first table, which shows a relationship in which a combination of at least one of the first and second transmission resources and modulation symbols is mapped to an ACK/NACK signal, by using $n_{PUCCH}^{(1)}$ corresponding to the transmission target ACK/NACK signal in the first table, wherein the first transmission resource is indicated by a control element used for a first downlink control channel, the second transmission resource is at least one transmission resource among sets of transmission resources in a second table indicated by a resource allocation indicator transmitted on a second downlink control channel, and the second table may show a correspondence relationship between indication values of the resource allocation indicators and sets of transmission resources transmitted to the UE through higher layer signaling.

The number of first and/or second transmission resources may be allocated according to the number of transmission bits of the ACK/NACK signal, and the resource allocation indicator may be transferred by using resource allocated to control information repeatedly transmitted through a plurality of CCs.

The sets of transmission resources may include transmission resources corresponding to the number of transport blocks transmitted on a data channel indicated by a control signal transmitted on the second downlink control channel.

The second transmission resource may be allocated according to the number of transport blocks transmitted on the data channel indicated by the control signal transmitted on the second downlink control channel.

The resource allocation indicator may be comprised of N-bit information, the second table may be comprised of $2^N$ number of resource groups, the resource groups may be comprised of the resource sets or elements of the resource sets, and the resource groups may be comprised of the same number of transmission resources as that of transport blocks transmitted on the data channel indicated by the second downlink control channel.

The method may further include: obtaining a third transmission resource different from the first and second transmission resources, wherein a transmission resource mapped in the first table may be allocated to a first antenna, a third transmission resource may be allocated to a second antenna, and modulation symbols mapped to the ACK/NACK signal in the first table may be transmitted through the first and second antennas.

According to another aspect of the present invention, there is provided a method for receiving an ACK/NACK signal for an HARQ (Hybrid Automatic Repeat reQuest) in a CA system, including: allocating at least one transmission resource to be used for reception of an uplink ACK/NACK signal through a resource allocation indicator transmitted on a downlink control channel; and transmitting a resource allocation indicator on a downlink control channel, wherein the resource allocation indicator may indicate at least one transmission resource in a resource allocation table, and the resource allocation table may show a correspondence relationship between indication values of the resource allocation indicators and sets of transmission resources transmitted to the UE through higher layer signaling.

The resource allocation indicator may be transferred by using resource allocated to control information repeatedly transmitted through a plurality of CCs, and may be comprised of N-bit information. When the resource allocation indicator is comprised of N-bit information, the resource allocation table may be comprised of $2^N$ number of resource groups, and the resource groups may be comprised of resource sets or elements of the resource sets.

The resource groups may be comprised of the same number of transmission resources as that of transport blocks transmitted on the data channel indicated by the downlink control channel.

According to another aspect of the present invention, there is provided an apparatus for transmitting an ACK/NACK signal for an HARQ (Hybrid Automatic Repeat reQuest) in a CA system, including: an RF unit receiving a downlink transport block through a downlink allocation indicated by a downlink control channel and transmitting an ACK/NACK signal with respect to the downlink transport block; and a signal processing unit processing a signal received from the RF unit and a signal transmitted via the RF unit, wherein the signal processing unit obtains at least one of first and second transmission resources and determines transmission symbols and transmission resource mapped to the ACK/NACK signal to be transmitted, and the RF unit transmits the transmission symbols by using the transmission resource, the transmission symbols and the transmission resource are determined correspondingly according to an ACK/NACK to be transmitted in a first table, which shows a relationship in which a combination of at least one of the first and second transmission resources and modulation symbols is mapped to an ACK/NACK signal, the first transmission resource is indicated by a control element used for a first downlink control channel, the second transmission resource is at least one transmission resource among sets of transmission resources in a second table indicated by a resource allocation indicator transmitted on a second downlink control channel, and the second table may show a correspondence relationship between indication values of the resource allocation indicators and sets of transmission resources configured based on transmission resources transmitted to the UE through higher layer signaling.

The resource allocation indicator may be comprised of N-bit information, the second table may be comprised of $2^N$ number of resource groups, and the resource groups may be comprised of the resource sets or elements of the resource sets.

According to another aspect of the present invention, there is provided an apparatus for receiving an ACK/NACK signal for an HARQ (Hybrid Automatic Repeat reQuest) in a CA system, including: an RF unit transmitting a downlink transport block through a downlink allocation indicated by a downlink control channel and receiving an ACK/NACK signal with respect to the downlink transport block; and a signal processing unit processing a signal transmitted from the RF unit and a signal received via the RF unit, wherein the signal processing unit allocates at least one transmission resource to be used for transmission of an ACK/NACK signal through a resource allocation indicator transmitted on the downlink control channel, the RF unit transmits a resource allocation indicator on the downlink control channel, the resource allocation indicator indicates at last one transmission resource in a resource transmission table, and the resource allocation table shows a correspondence relationship between indication values of the resource allocation indicators and sets of transmission resources transmitted to a user equipment (UE) through higher layer signaling.

The number of transmission resources mapped to the value of the resource allocation indicator may correspond to the number of transport blocks transmitted on a data channel indicated by the downlink control channel.

According to an embodiment of the present invention, in a CA system, transmission resources for transmitting an ACK/NACK signal with respect to a plurality of component carriers can be effectively allocated.

According to an embodiment of the present invention, in a CA system, radio resources can be effectively used by using resource allocated to repeatedly transferred control signals.

According to an embodiment of the present invention, in a CA system, a collision of radio resources can be prevented and smooth communication can be performed.

DETAILED DESCRIPTION OF THE ILLUSTRATED EMBODIMENTS

Embodiments of the present invention will now be described in detail with reference to the accompanying drawings. It should be understood that, in applying reference numerals to constituents of each drawing, although the same constituents are shown on different drawings, they are denoted by the same reference numbers as possible. In describing the present invention, if a detailed explanation for a related known function or construction is considered to unnecessarily divert the gist of the present invention, such explanation will be omitted but would be understood by those skilled in the art.

In describing the elements of the present invention, terms such as first, second, A, B, (a), (b), etc., may be used. Such terms are used for merely discriminating the corresponding elements from other elements and the corresponding elements are not limited in their essence, sequence, or precedence by the terms. It will be understood that when an element or layer is referred to as being "on" or "connected to" another element or layer, it can be directly on or directly connected to the other element or layer, or intervening elements or layers may be present.

In the present disclosure, a wireless communication network will be described, and an operation performed in the wireless communication network may be performed in a process of controlling a network and transmitting data by a system (e.g., a base station (BS)) administering the corresponding wireless communication network or may be performed in a mobile station (MS) connected to the corresponding wireless network.

A wireless communication system is widely disposed to provide various communication services such as voice and packet data, or the like. The wireless communication system includes at least one base station (BS). A BS generally refers to a fixed station that communicates with a mobile station (MS) and may be called by other names such as evolved-node B (eNB), base transceiver system (BTS), access point (AP), etc. Each BS provides a communication service to particular geographical areas (which are generally called cells). Cells may be construed to have comprehensive meanings indicating partial areas covered by a BS, and may include various coverage areas such as a mega-cell, a macro-cell, a micro-cell, a pico-cell, a femto-cell, and the like.

A mobile station (MS) may be fixed or mobile and may be referred to by other names such as user equipment (UE), mobile terminal (MT), user terminal (UT), subscriber station (SS), wireless device, personal digital assistant (PDA), wireless modem, handheld device, etc.

Multi-access schemes applied to the wireless communication system are not limited. Namely, various multi-access schemes such as CDMA Code Division Multiple Access), TDMA (Time Division Multiple Access), FDMA (Frequency Division Multiple Access), OFDMA (Orthogonal Frequency Division Multiple Access), SC-FDMA (Single Carrier-FDMA), OFDM-FDMA, OFDM-TDMA, OFDM-CDMA, or the like, may be used. A TDD (Time Division Duplex) scheme in which transmission is made by using a different time or an FDD (Frequency Division Duplex) scheme in which transmission is made by using different frequencies may be applied to an uplink transmission or a downlink transmission.

A carrier aggregation (CA) supports a plurality of carriers, which is also called a spectrum aggregation or a bandwidth aggregation.

Sizes (i.e., bandwidths) of component carriers constituting a CA may vary.

Hereinafter, a multi-carrier system refers to a system supporting the carrier aggregation.

Component carriers may be divided into a primary component carrier and a secondary component carrier depending on whether or not they are activated. The primary component carrier is a carrier which is activated all the time, and the secondary carrier is a carrier which is activated or deactivated according to particular conditions. Here, activation refers to a state in which traffic data is transmitted or received or a state in which traffic data is ready to be transmitted or received. Deactivation refers to a state in which traffic data cannot be transmitted or received and measurement or transmission or reception of minimum information is available. A UE may use only one primary component carrier or one or more secondary component carriers along with a primary component carrier.

Figure 1:
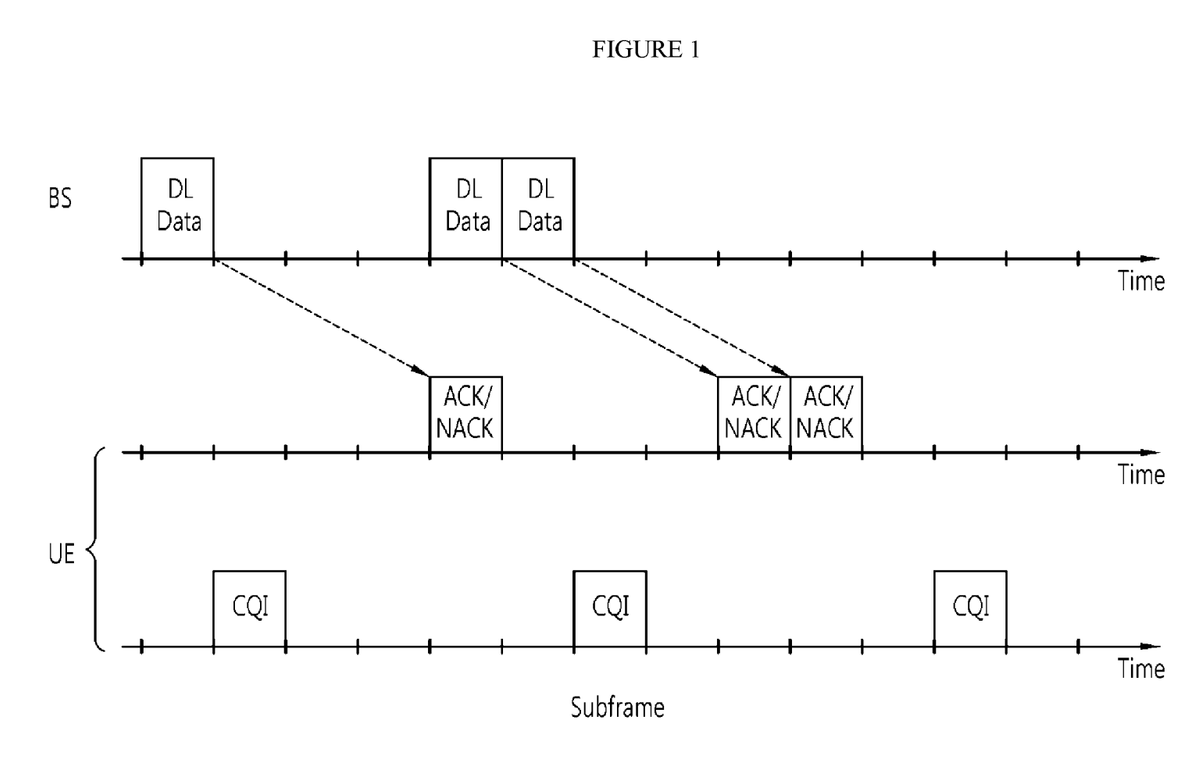
FIG. 1 is a conceptual view for schematically explaining a downlink HARQ and CQI transmission.

FIG. 1 shows a downlink HARQ and CQI transmission.

With reference to FIG. 1, when a UE receives downlink data from a BS, it transmits ACK (ACKnowledgement)/NACK (Not-ACKnowledgement) information after the lapse of a certain time. The downlink data may be transmitted on a PDSCH indicated by a PDCCH. The ACK/NACK signal may be ACK information when the downlink data is successfully decoded, and may be NACK information when the downlink data fails to be decoded. When the NACK information received, the BS may retransmit the downlink data up to a maximum retransmission number.

A transmission time of the ACK/NACK signal with respect to the downlink data or a resource allocation may be dynamically informed by the BS, or may be previously agreed according to a transmission time of the downlink data or a resource allocation.

The UE may measure a downlink channel state and report a CQI to the BS periodically and/or aperiodically. The BS may inform the UE about a transmission time of the CQI or a resource allocation.

Meanwhile, the PUCCH may support multiple formats. Namely, it may transmit uplink control information having different number of bits per subframe according to a modulation scheme and a PUCH transmission format. Table 1 below shows modulation schemes and number of bits according to various PUCCH formats.

TABLE 1

| PUCCH format | Modulation scheme | Number of bits per subframe |
|---|---|---|
| 1 | N/A | N/A |
| 1a | BPSK | 1 |
| 1b | QPSK | 2 |
| 2 | QPSK | 20 |
| 2a | QPSK + BPSK | 21 |
| 2b | QPSK + QPSK | 22 |
| 3 | QPSK | 48 |

PUCCH format 1 may be used for transmitting a scheduling request (SR). PUCCH format 1a/1b may be used for transmitting an HARQ ACK/NACK signal. PUCCH format 2 may be used for transmitting a CQI, and PUCCH format 2a/2b may be used for transmitting HARQ ACK/NACK. When the HARQ ACK/NACK signal is transmitted alone, PUCCH format 1a/1b/3 may be used, and when SR is transmitted alone, PUCCH format 1 may be used.

Resource index $n^{(1)}_{PUCCH}$, resource for transmission of PUCCH format 1/1a/1b is used to determine the amount of CS $\alpha(n_s,1)$ of a basic sequence and an orthogonal sequence index $n_{OC}(n_s)$, as well as the position of a physical resource block in which the ACK/NACK signal is transmitted. The resource index $n^{(1)}_{PUCCH}$ for the HARQ ACK/NACK may be obtained as shown in Table 2 below. The resource index $n^{(1)}_{PUCCH}$ may be used as a parameter for determining a physical RB index $n_{PRB}$, the amount of CS $\alpha(n_s,1)$ of the basic sequence, the orthogonal sequence index $n_{OC}(n_s)$, and the like.

TABLE 2

| | Dynamic scheduling | Semi-persistent scheduling |
|---|---|---|
| Resource index | $n^{(1)}_{PUCCH} = n_{CCE} + N^{(1)}_{PUCCH}$ | Signaled by higher layer or a control channel |
| Higher Layer Signaling value | $N^{(1)}_{PUCCH}$ | $n^{(1)}_{PUCCH}$ |

Namely, the HARQ ACK/NACK signal with respect to the PDCCH transmitted at an nth subframe is transmitted at a (n+4)th subframe by using resource index $n^{(1)}_{PUCCH}$, the sum of a first CCE (Control Channel Element) index $n_{CCE}$ of the PDCCH transmitted in the nth subframe and the value $N^{(1)}_{PUCCH}$ obtained through higher layer signaling or a separate control channel. For example, $N^{(1)}_{PUCCH}$ may be a total number of PUCCH format 1/1a/1b resources required for semi-persistent scheduling (SPS) transmission and service request (SR) transmission. As for the semi-persistent scheduling (SPS) transmission and service request (SR) transmission, since there is no PDCCH indicating the corresponding PDSCH transmission, the BS may explicitly inform the UE about $n^{(1)}_{PUCCH}$.

When the HARQ ACK/NACK signal and/or the SR are transmitted through PUCCH format 1/1a/1b, the physical RB index $n_{PRB}$ is determined by the resource index $n^{(1)}_{PUCCH}$. This is shown as expressed by Equation 1 below.

Math FIG. 1

$$m = \begin{cases} N^{(2)}_{RB} & \text{if } n^{(1)}_{PUCCH} < c \cdot N^{(1)}_{cs} / \Delta^{PUCCH}_{shift} \\ \left\lfloor \frac{n^{(1)}_{PUCCH} - c \cdot N^{(1)}_{cs} / \Delta^{PUCCH}_{shift}}{c \cdot N^{RB}_{sc} / \Delta^{PUCCH}_{shift}} \right\rfloor + N^{(2)}_{RB} + \left\lceil \frac{N^{(1)}_{cs}}{8} \right\rceil & \text{otherwise} \end{cases}$$

$$c = \begin{cases} 3 & \text{normal cyclic prefix} \\ 2 & \text{extended cyclic prefix} \end{cases}$$

$$n_{PRB} = \begin{cases} \left\lfloor \frac{m}{2} \right\rfloor & \text{if } (m + n_s \bmod 2)\bmod 2 = 0 \\ N^{UL}_{RB} - 1 - \left\lfloor \frac{m}{2} \right\rfloor & \text{if } (m + n_s \bmod 2)\bmod 2 = 1 \end{cases}$$

PUCCH format 3 is a PUCCH format employing DFT-S-OFDM (Discrete Fourier Transform-Spreading-Orthogonal Frequency-Division Multiplexing), which uses DFT-IFFT and block-spreading. When the HARQ ACK/NACK signal is transmitted by using PUCCH format 3, information of up to maximum 10 bits in case of FDD and information of up to maximum 20 bits may be transmitted in the HARQ ACK/NACK signal by using one ACK/NACK resource.

Meanwhile, when the ACK/NACK signal is transmitted through the PUCCH by using multiple antennas in uplink, diversity can be obtained by transmitting the same ACK/NACK symbols through different resources by using different resources. In this case, however, since the same ACK/NACK signal is transmitted through different antennas, different ACK/NACK transmission resources should be allocated to the respective antennas in order to prevent a collision of resources.

For example, an ACK/NACK transmission resource may be allocated to a first antenna according to a signal transmission table, and an ACK/NACK transmission resource may be allocated to a second antenna from a resource domain not designated by the signal transmission table to transmit the same ACK/NACK signal through the different antennas, thereby preventing a collision of resources and obtaining transmission diversity.

In a carrier aggregation environment, the HARQ ACK/NACK signal may be transmitted through PUCCH format 1/1a/1b using the signal transmission table. The signal transmission table is a table for mapping a message to be transmitted, resource to be used for transmitting the corresponding message and modulation symbols. The signal transmission table may be configured in various manners. For example, the signal transmission table may be comprised of combinations of a plurality of resource indexes and modulation symbols of an ACK/NACK signal, may be implemented differently according to the number (M) of bits used for transmitting an ACK/NACK signal, or may be configured as a single table including the number (M) of every bit. Thus, when a signal transmission table is used with respect to ACK/NACK information having 4 bits or smaller in the carrier aggregation environment, the signal transmission table may be configured when the M values are 2, 3, and 4, and utilized for an ACK/NACK transmission resource allocation. An example of the method for allocating transmission resources and mapping transmission resources and modulation symbols by using the signal transmission table is channel selection. In the following description, channel selection will be taken as an example of a method of using the signal transmission table according to an embodiment of the present invention for the sake of brevity.

The format of a table used for channel selection (referred to as a 'channel selection table', hereinafter) may be transferred to the UE and the BS in advance by higher layer signaling or may be a table already owned by the UE and the BS. The UE may obtain resource indexes for configuring the channel selection table through separate signaling, a transport channel, or the like, from a higher channel.

In order to allocate resource for transmitting the ACK/NACK signal in the PUCCH format 1/1a/1b using channel selection, the BS may allocate resource indexes according to an implicit resource allocation scheme. The implicit allocating of a resource index by the BS refers to allocating a calculated resource index by using $n_{CCE}$ indicating the number of a CCE, among the at least one CCE constituting the PDCCH of CC#a, as a parameter.

The BS may allocate resource indexes according to an explicit resource allocation scheme. The explicit allocating of resource indexes by the BS refers to allocating a resource index of a PUCCH dedicated to a particular UE to the UE through a separate resource allocation indicator, or the like, without relying on $n_{CCE}$. Here, the separate resource allocation indicator includes signaling, or the like, from an upper layer or a physical layer. Also, the resource allocation indicator may be included as control information or system information in the PDCCH.

In order to explicitly allocate a resource index, the BS may utilize an indicator used for transferring different control information, as a resource allocation indicator. For example, the BS may utilize a power indicator (PI) with respect to uplink transmission power, as a resource allocation indicator.

The PI is an indicator for controlling and adjusting uplink transmission power. In general, a DCI format indicating a downlink grant includes 2-bit PI field for controlling power with respect to the PUCCH, and a DCI format indicating an uplink grant includes 2-bit PI field for controlling power with respect to the PUSCH. One example of the PI may be a transmission power control (TPC). Hereinafter, for content related to the PI in an embodiment of the present invention, the TPC will be described as an example for the sake of brevity.

When cross-carrier scheduling is applied in the carrier aggregation environment, downlink grants regarding one or more target control carriers (i.e., carriers to be controlled) may be transmitted through control carriers. The control carriers may be carriers transmitting the PDCCH indicating the PDSCH of the target control carriers in cross-carrier scheduling, which may be primary component carriers (CC) or secondary component carriers. The target control carriers may be carriers whose PDSCH is indicated by the PDCCH of control carriers, which may be secondary CCs. All of the downlink grants transmit a TPC with respect to the PUCCH of the uplink CCs linked to the control carriers. In this case, one or more of the same TPCs for controlling power of the same uplink PUCCH are transmitted. These act as overhead of the downlink control information resultantly. Thus, when a plurality of TPCs with respect to one PUCCH exist due to transmission of a plurality of downlink grants, the bits allocated to the repeated TPC fields may be diverted to be used for transmitting different control information to effectively use the limited radio resource.

Figure 2:
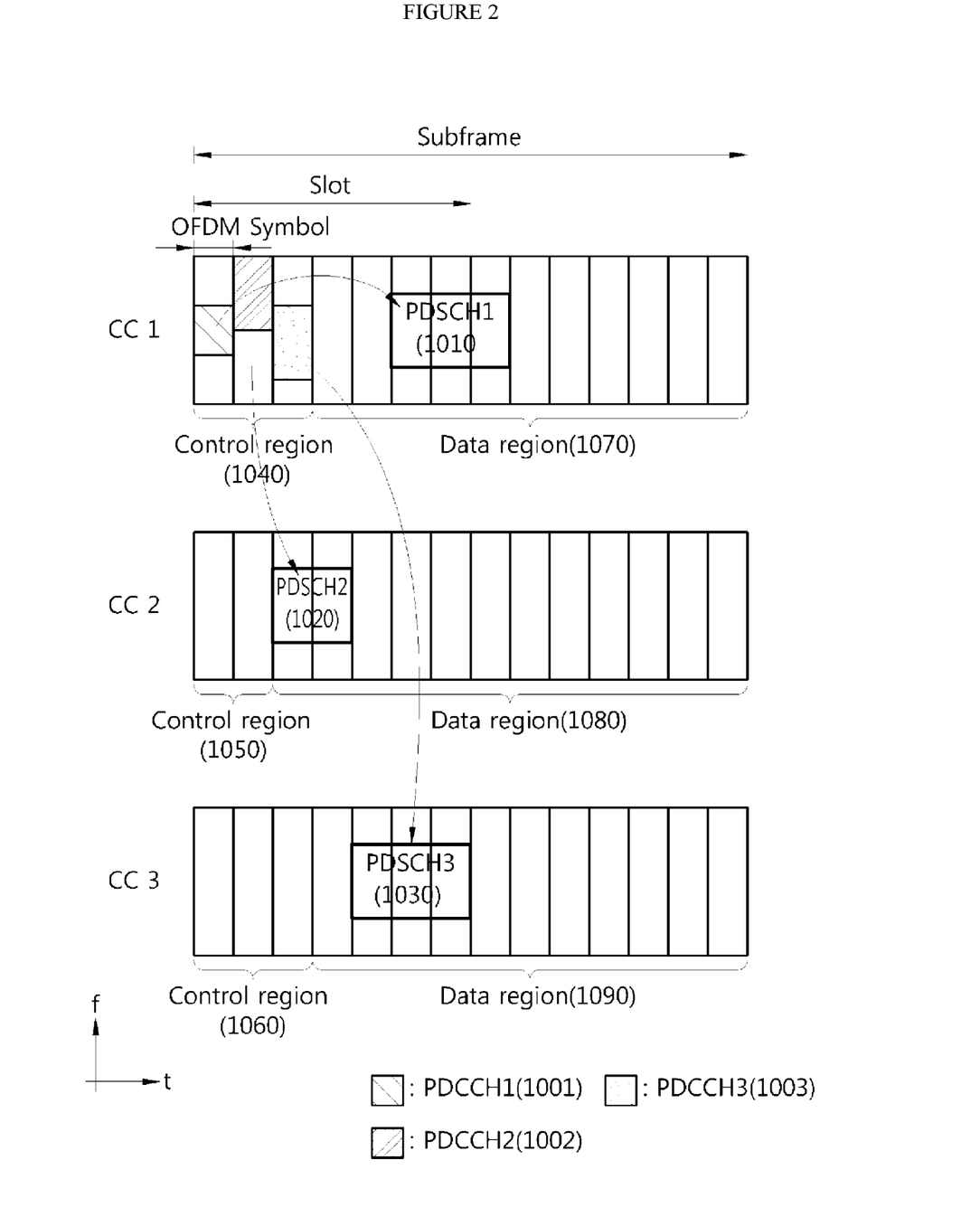
FIG. 2 is a view for schematically explaining a method for transmitting downlink control information in a CA system.

FIG. 2 is a view for schematically explaining a method for transmitting downlink control information and cross-carrier scheduling in a CA system.

In the example of FIG. 2, the multi-CC system provides three CCs, i.e., CC1, CC2, and CC3 through carrier aggregation (CA) to the UE. Among them, one may be a primary CC and the others may be secondary CCs. It is assumed that CC1 is a primary CC for the sake of brevity.

A downlink subframe of each CC may include a control region including a PDCCH and a data region including a PDSCH. For example, CC1 includes a data region 1070 and a control region 1040, CC2 includes a data region 1080 and a control region 1050, and CC3 includes a data region 1090 and a control region 1060.

When CC1, CC2, and CC3 are operated according to cross-carrier scheduling, CC1 may include PDCCHs regarding the PDSCHs 1020 and 1030 of carriers CC2 and CC3, as well as a PDCCH with respect to its PDSCH 1010. For example, the control region 1040 of CC1 may include PDCCH1 1001 with respect to the PDSCH of CC1, PDCCH2 1002 with respect to the PDSCH of CC2, and PDCCH 3 1003 with respect to the PDSCH of CC3.

Control information transmitted through the PDCCH is called downlink control information (DCI). A usage purpose of the DCI is different according to its format and a field defined in the DCI is different. The DCI includes uplink resource allocation information and downlink resource allocation information. The uplink resource allocation information may be called an uplink grant and the downlink resource allocation information may be called a downlink grant. For example, DCI format 0 may indicate uplink resource allocation information, and DCI formats 1 to 2C may downlink resource allocation information, and DCI formats 3 and 3A may indicate an uplink TPC (Transmit Power Control) command with respect to certain UE groups. Respective fields of a DCI may be sequentially mapped to information bits. PDCCH1 1001 with respect to the PDSCH of CC1, PDCCH2 1002 with respect to the PDSCH of CC2, and PDCCH3 1003 with respect to the PDSCH of CC3 may transmit a DCI of any one format among DCI 1/1A/1B/1C/1D/2/2A/2B/2C. A resource allocation field included in the DCI may indicate a PDSCH of a particular CC. For example, the DCI of the PDCCH1 1001 may indicate the PDSCH1 1010, the DCI of the PDCCH2 1002 may indicate the PDSCH2 1020, and the DCI of PDCCH3 1003 may indicate the PDSCH3 1030.

In this manner, in the carrier aggregation, the DCI information of the PDCCH may transmit resource allocation information with respect to a different carrier, as well as resource allocation within the carrier to which the corresponding PDCCH belongs. This is called cross-carrier scheduling. According to the cross-carrier scheduling, control information regarding a secondary CC can be transmitted through a primary CC, so scheduling becomes flexible.

Meanwhile, the DCI may further include various fields besides the resource allocation field. For example, the respective DCIs may include a transmission field TPC.

The UE may monitor a plurality of PDCCHs transmitted in the CA environment. For example, the UE may monitor the plurality of PDCCHs in a blind decoding manner by using a particular RNTI (Radio Network Temporary Identifier) allocated to the UE itself, and extract a transmission field.

Figure 3:
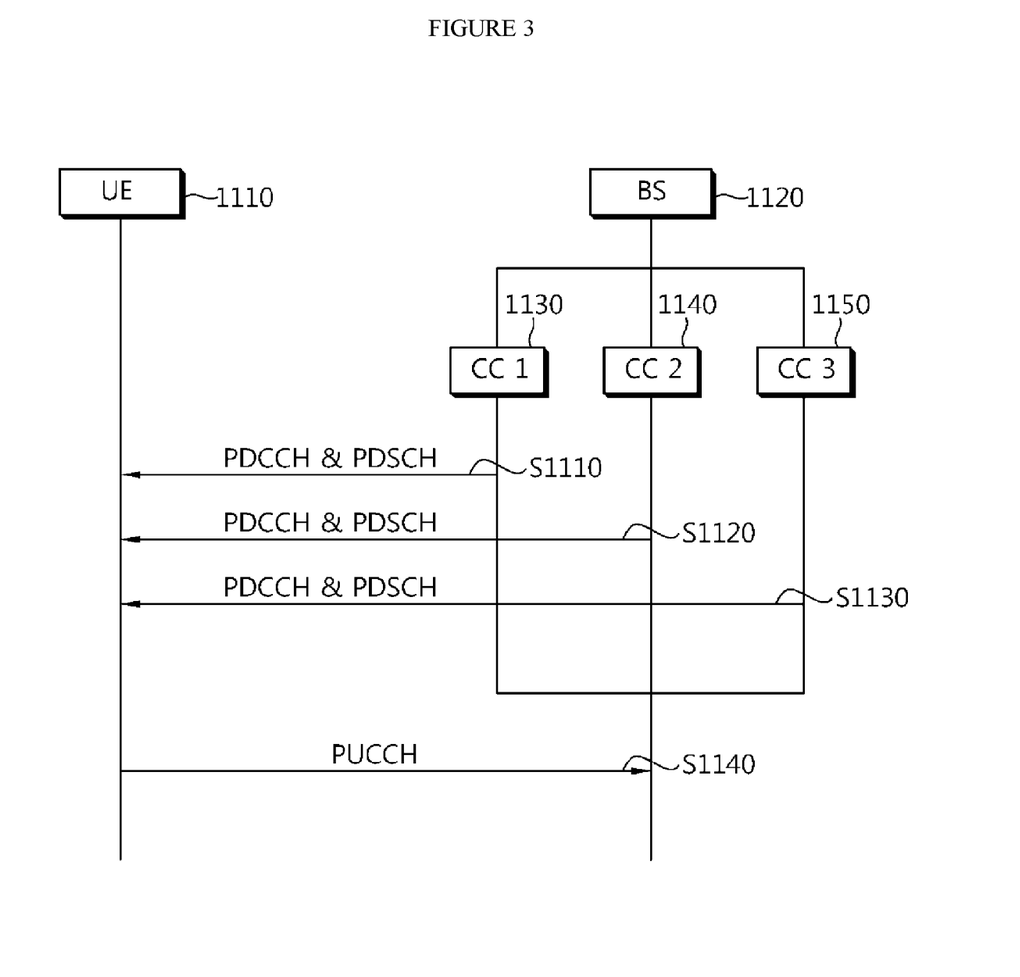
FIG. 3 is a view schematically showing a transmission and reception relationship between a base station and a user equipment in the CA system.

FIG. 3 is a view schematically showing a transmission and reception relationship between a BS 1120 and a UE 1110 in the CA system.

The BS 1120 aggregates three CCs of CC1 1130, CC2 1140, and CC3 1150, and transmits the same to the UE 1110.

Required information is included in the respective CCs CC1 1130, CC2 1140, and CC3 1150 and transferred on the PDCCH and the PDSCH, respectively (S1110, S1120, and S1130). Here, the PDCCHs of the respective CCs CC1 1130, CC2 1140, and CC3 1150 include a TPC for controlling uplink power.

Upon receiving the respective CCs CC1 1130, CC2 1140, and CC3 1150, the UE 1110 transfers required information on a PUCCH to the BS 1120 in response (S1140). The PUCCH includes an HARQ ACK/NACK signal with respect to whether or not the PDSCHs of the respective CCs CC1 1130, CC2 1140, and CC3 1150 have been received without an error.

When one PUCCH is transmitted to the BS with respect to a downlink transmission, as described above, the repeated information of the power indicators TPC1, TPC2, and TPC3 with respect to the same PUCCH may be included and transmitted on the PDCCH of the respective CCs CC1, CC2, and CC3 to the UE. Thus, a method for utilizing the bits allocated to the repeatedly transmitted TPC fields with respect to the same PUCCH in order to transmit different control information may be considered.

In FIG. 3, when CC1 is a primary CC (PCC) and CC2 and CC3 are secondary CCs (SCC1 and SCC2), the TCP field included in the PDCCH of the PCC may be used to transfer information for controlling uplink PUCCH power and bits allocated to the TPC fields included in the PDCCHs of SCC1 and SCC2 may be used to transfer different control information.

For example, resource may be allocated by using two bits allocated to the TCP fields included in the PDCCHs of the SCC1 and/or SCC2 to obtain resources constituting a channel selection table for transmitting 2-4 bit ACK/NACK signal through the PUCCH.

Figure 4:
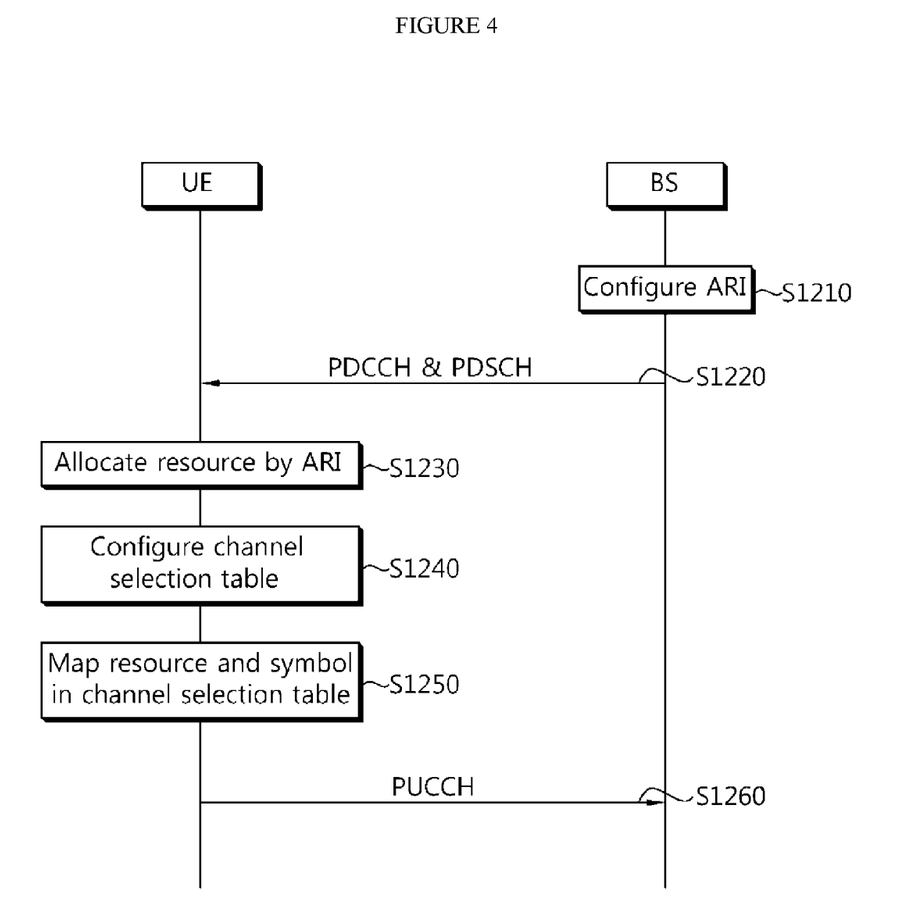
FIG. 4 is a view schematically explaining using resource allocated to repeated TPC (Transmission Power Control) fields in the CA system.

FIG. 4 is a view schematically explaining using resource allocated to the repeated TPC fields in the CA system.

In the CA environment, in order to allocate resource to be used for an uplink signal transmission, the BS configures a resource allocation indicator (S1210). For example, an ACK/NACK resource indicator (ARI) may be configured for an uplink HARQ ACK/NACK signal. The ARI is an indicator explicitly allocating PUCCH resource(s) to be used for the UE to transmit the HARQ ACK/NACK signal. In the following description, the ARI will be taken as an example of the PUCCH resource allocation indicator according to the present embodiment.

The BS transmits required information on the PDCCH and the PDSCH to the UE through CCs (S1220). When a plurality of CCs are transmitted, e.g., when SCCs are transmitted together with a PCC in the multi-CC system, the TPC fields included in the PDCCHs of the SCCs are repeated with the TPC with respect to the PUCCH included in the PDCCH of the PCC. The BS may transmit the ARI by using the bits allocated to the repeated TPC fields on the SCCs.

The UE checks the PDCCHs of the CCs received from the BS, and is allocated resource from the ARI transmitted by using the bits allocated to the TPC fields on the SCCs according to the explicit resource allocation method (S1230).

The UE may configure a channel selection with the transmission resource obtained through the ARI and the implicitly allocated transmission resource (to be described) (S1240).

The UE maps PUCCH resource to be used for HARQ ACK/NACK transmission and modulated symbols according to HARQ ACK/NACK information received by UE in the channel selection table (S1250). Mapping in the channel selection table may be simply matching transmission resource to be used for transmission with respect to a message/signal to be transmitted and/or matching resource to be used for the transmission and symbols according to a type of a message and/or a signal to be transmitted. For example, in case of transmission of the HARQ ACK/NACK signal, transmission resource to be used for the transmission and symbols to be transmitted may be mapped.

The UE may transmit symbols and/or a message on the PUCCH by using the transmission resource determined through mapping in the channel selection table (S1260).

In general, ACK/NACK information regarding PDSCH of a plurality of downlink CCs are transmitted through a single UL PCC, e.g., a single PUCCH. Thus, when a plurality of CCs are used for downlink transmission, as mentioned above, the TPC fields with respect to the PUCCH of the PDCCHs of the respective CCs are repeated.

In particular, when an HARQ ACK/NACK signal with respect to the PDSCHs transferred according to the PUCCH format 1b using channel selection in the CA environment, namely, transferred by downlink SCCs has 1 to 4 bits, 2-bit TPC field within the PDCCHs is diverted to be used to configure a channel selection table for transmitting the uplink HARQ ACK/NACK signal.

Hereinafter, the exclusive use of the 2-bit TPC field within the PDCCHs to configure a channel selection table for transmitting the uplink HARQ ACK/NACK signal when the HARQ ACK/NACK signal with respect to the PDSCHs transferred via downlink SCCs has 1 to 4 bits according to an embodiment to which the technical concept of the present invention is applied will be described. Here, a case in which a plurality of CCs are transmitted from the BS to the UE in order to divert the 2-bit TPC field to be used for an ARI (ACK/NACK Resource Indicator) will be considered.

For the sake of brevity, the case in which the 2-bit TPC field is diverted to be used to transmit the ARI and a channel selection table is configured by using the 2-bit TPC field will be described, but the technical concept of the present invention is not limited thereto.

An ARI resource mapping table for allocating resource to the ARI may be transmitted in advance to the UE through higher layer signaling. The ARI resource mapping table is comprised of values of the ARI and HARQ ACK/NACK transmission resources allocated according to the ARI values. The number of ACK/NACK transmission resources required for configuring the ARI resource mapping table is determined by the number of SCCs configured through an RRC and a transmission mode. Here, the transmission mode is related to whether to transmit one transport block for each CC or whether to transmit two transport blocks for each CC within the subframe, but the present invention is not limited thereto, and the transmission mode may reflect various transmission formats, and the ACK/NACK transmission resource may be determined by various transmission modes. Here, the transport block is also called a codeword.

As described above, the ARI resource mapping table is differently configured according to the number of ACK/NACK transmission resources. The ARI resource mapping table may be previously transferred to the UE through higher layer signaling. In the PUCCH format 1b using channel selection in the CA environment, as for ACK/NACK transmission resources required for transmitting an ACK/NACK signal with respect to the PDSCHs transmitted through SCCs, 1 to 4 resources are required to be designated as an ARI table.

One ACK/NACK transmission resource may be required, for example, when a PDSCH including one transport block is transmitted through an SCC.

Two ACK/NACK transmission resources may be required, for example, when PDSCHs including two transport blocks are transmitted through an SCC, or when a PDSCH including one transport block is transmitted through two SCCs, respectively, Three ACK/NACK transmission resources may be required, for example, when a PDSCH including one transport block is transmitted through one SCC and PDSCH and a PDSCH including two transport blocks is transmitted through different SCCs, or when a PDSCH including one transport block is transmitted through three SCCs, respectively.

Four ACK/NACK transmission resources may be required, for example, when a PDSCH including two transport blocks is transmitted through two SCCs, respectively, when a PDSCH including two transport blocks through one SCC and a PDSCH including one transport block is transmitted through two different SCCs, or when a PDSCH including one transport block is transmitted through four SCCs, respectively.

The ACK/NACK transmission resources with respect to a PDSCH indicated by the PDCCH transmitted through the PCC are allocated according to an implicit resource allocation scheme, so transmission resource may not be allocated explicitly through an ARI.

Each case according to the number of ACK/NACK transmission resources required for transmitting an ACK/NACK signal with respect to the PDSCHs transmitted through SCCs will be described.

(1) When One ACK/NACK Transmission Resource is Required

Since one ACK/NACK transmission resource is required, respective resource sets for configuring an ARI resource mapping table have elements corresponding to one ACK/NACK transmission resource, respectively.

For example, when resource sets transferred in advance through higher layer signaling are {n1}, {n2}, {n3}, and {n4}, the ARI resource mapping table may be configured as shown in Table 3 below.

TABLE 3

| ACK/NACK resource indicator | Mapped ACK/NACK transmission resource |
|---|---|
| 00 | First resource set, i.e., {n1} |
| 01 | Second resource set, i.e., {n2} |
| 10 | Third resource set, i.e., {n3} |
| 11 | Fourth resource set, i.e., {n4} |

Table 3 is an ARI resource mapping table configured for the sake of convenience in order to easily explain the present invention, and the specific values in the ARI resource mapping table according to an embodiment of the present invention are not limited thereto. For example, a table may not be configured with the sets having one element but a table may be configured with respective elements of one set {n1, n2, n3, n4}.

Here, a 2-bit TPC on the PDCCHs with respect to the PDSCHs of the SCCs, among a plurality of CCs transmitted to downlink, may be used for the ARI. The ACK/NACK transmission resource is allocated according to the ARI value on the PDCCHs with respect to the PDSCHs of the received SCCs. For example, when the ARI is '00', a resource set {n1} is allocated.

(2) When Two ACK/NACK Transmission Resources are Required

Since two ACK/NACK transmission resources are required, respective resource sets for configuring an ARI resource mapping table may be four sets having elements corresponding to two ACK/NACK transmission resources or two sets having elements corresponding to four ACK/NACK transmission resources.

When resource sets previously transferred through higher layer signaling are four sets, e.g., {n1, n2}, {n3, n4}, {n5, n6}, {n7, n8}, having elements corresponding to two ACK/NACK transmission resources, the ARI resource mapping table may be configured as shown in Table 4 below.

TABLE 4

| ACK/NACK resource indicator | Mapped ACK/NACK transmission resource |
|---|---|
| 00 | First resource set, i.e., {n1, n2} |
| 01 | Second resource set, i.e., {n3, n4} |

TABLE 4-continued

| ACK/NACK resource indicator | Mapped ACK/NACK transmission resource |
|---|---|
| 10 | Third resource set, i.e., {n5, n6} |
| 11 | Fourth resource set, i.e., {n7, n8} |

When resource sets previously transferred through higher layer signaling are two sets, e.g., {n1, n2, n3, n4}, {n5, n6, n7, n8}, having elements corresponding to four ACK/NACK transmission resources, the ARI resource mapping table may also be configured as shown in Table 5 below.

TABLE 5

| ACK/NACK resource indicator | Mapped ACK/NACK transmission resource |
|---|---|
| 00 | First resource set, i.e., {n1, n5} |
| 01 | Second resource set, i.e., {n2, n6} |
| 10 | Third resource set, i.e., {n3, n7} |
| 11 | Fourth resource set, i.e., {n4, n8} |

Table 4 and Table 5 are ARI resource mapping tables configured for the sake of convenience to easily explain the present invention, and the specific values in the ARI resource mapping table according to an embodiment of the present invention are not limited thereto.

When the ARI is '00', a resource set {n1, n2} is allocated in the example of Table 4. Also, when the ARI is '00', a resource set {n1, n5} is allocated in the example of Table 5.

(3) When Three ACK/NACK Transmission Resources are Required

Since three ACK/NACK transmission resources are required, respective resource sets for configuring an ARI resource mapping table may be four sets having elements corresponding to three ACK/NACK transmission resources or three sets having elements corresponding to four ACK/NACK transmission resources.

When resource sets previously transferred through higher layer signaling are four sets, e.g., {n1, n2, n3}, {n4, n5, n6}, {n7, n8, n9}, {n10, n11, n12}, having elements corresponding to three ACK/NACK transmission resources, the ARI resource mapping table may be configured as shown in Table 6 below.

TABLE 6

| ACK/NACK resource indicator | Mapped ACK/NACK transmission resource |
|---|---|
| 00 | First resource set, i.e., {n1, n2, n3} |
| 01 | Second resource set, i.e., {n4, n5, n6} |
| 10 | Third resource set, i.e., {n7, n8, n9} |
| 11 | Fourth resource set, i.e., {n10, n11, n12} |

When resource sets previously transferred through higher layer signaling are three sets, e.g., {n1, n2, n3, n4}, {n5, n6, n7, n8}, {n9, n10, n11, n12}, having elements corresponding to four ACK/NACK transmission resources, the ARI resource mapping table may also be configured as shown in Table 7 below.

TABLE 7

| ACK/NACK resource indicator | Mapped ACK/NACK transmission resource |
|---|---|
| 00 | First resources of each set, i.e., {n1, n5, n9} |
| 01 | Second resources of each set, i.e., {n2, n6, n10} |

TABLE 7-continued

| ACK/NACK resource indicator | Mapped ACK/NACK transmission resource |
|---|---|
| 10 | Third resources of each set, i.e., {n3, n7, n11} |
| 11 | Fourth resources of each set, i.e., {n4, n8, n12} |

Table 6 and Table 7 are ARI resource mapping tables configured for the sake of convenience to easily explain the present invention, and the specific values in the ARI resource mapping table according to an embodiment of the present invention are not limited thereto.

When the ARI is '00', a resource set {n1, n2, n3} is allocated in the example of Table 6. Also, when the ARI is '00', a resource set {n1, n5, n9} is allocated in the example of Table 7.

(4) When Four ACK/NACK Transmission Resources are Required

Since four ACK/NACK transmission resources are required, respective resource sets for configuring an ARI resource mapping table may be four sets having elements corresponding to four ACK/NACK transmission resources.

When resource sets previously transferred through higher layer signaling are four sets, e.g., {n1, n2, n3, n4}, {n5, n6, n7, n8}, {n9, n10, n11, n12}, {n13, n14, n15, n16}, having elements corresponding to four ACK/NACK transmission resources, the ARI resource mapping table may be configured as shown in Table 8 below.

TABLE 8

| ACK/NACK resource indicator | Mapped ACK/NACK transmission resource |
|---|---|
| 00 | First resource set, i.e., {n1, n2, n3, n4} |
| 01 | Second resource set, i.e., {n5, n6, n7, n8} |
| 10 | Third resource set, i.e., {n9, n10, n11, n12} |
| 11 | Fourth resource set, i.e., {n13, n14, n15, n16} |

When resource sets previously transferred through higher layer signaling are {n1, n2, n3, n4}, {n5, n6, n7, n8}, {n9, n10, n11, n12}, {n13, n14, n15, n16}, the ARI resource mapping table may also be configured as shown in Table 9 below.

TABLE 9

| ACK/NACK resource indicator | Mapped ACK/NACK transmission resource |
|---|---|
| 00 | First resources of each set, i.e., {n1, n5, n9, n13} |
| 01 | Second resources of each set, i.e., {n2, n6, n10, n14} |
| 10 | Third resources of each set, i.e., {n3, n7, n11, n15} |
| 11 | Fourth resources of each set, i.e., {n4, n8, n12, n16} |

Table 8 and Table 9 are ARI resource mapping tables configured for the sake of convenience to easily explain the present invention, and the specific values in the ARI resource mapping table according to an embodiment of the present invention are not limited thereto.

When the ARI is '00', a resource set {n1, n2, n3, n4} is allocated in the example of Table 8. Also, when the ARI is '00', a resource set {n1, n5, n9, n13} is allocated in the example of Table 9.

Meanwhile, as described above, in the CA environment, HARQ ACK/NACK information having less than 4 bits may be transmitted according to PUCCH format 1b using channel selection.

The format of the channel selection table is previously transferred to the UE and the BS through higher layer signaling.

The UE may be allocated ACK/NACK transmission resource for configuring a channel selection table according to a implicit resource allocation scheme or according to an explicit resource allocation scheme.

In the multi-CC system, an ACK/NACK transmission resource with respect to the PDSCH indicated by the PDCCH transmitted through a PCC may be allocated according to the implicit resource allocation scheme. An ACK/NACK transmission resource with respect to a PDSCH indicated by the PDCCH transmitted through an SCC may be allocated according to the explicit or implicit resource allocation scheme. Here, as the explicit resource allocation scheme in which the ACK/NACK transmission resource with respect to the PDSCH indicated by the PDCCH transmitted through an SCC is allocated, the foregoing resource allocation scheme using the ARI may be used.

Figure 5:
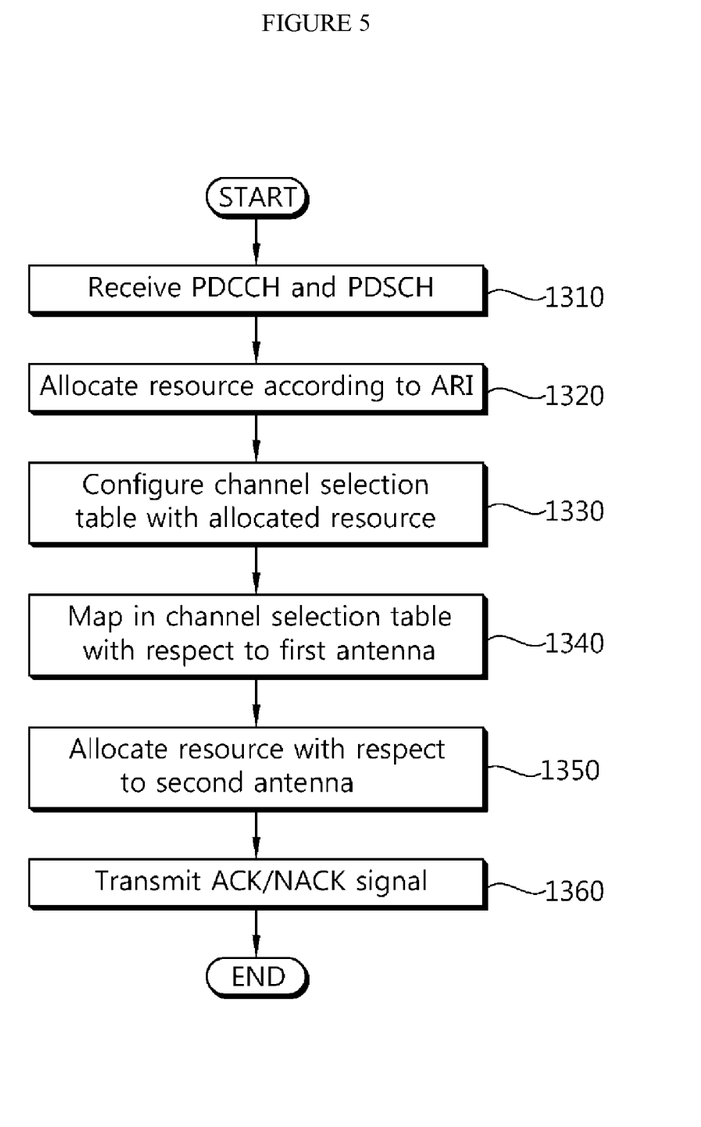
FIG. 5 is a flow chart illustrating the process of a method for transmitting an ACK/NACK signal by a user equipment in a multi-antenna system.

FIG. 5 is a flow chart illustrating the process of a method for transmitting an ACK/NACK signal by the UE in a multi-antenna system.

The UE receives a plurality of CCs from the BS and receives information on the PDCCH and the PDSCH (S1310).

Transmission resource may be allocated to the PDSCH indicated by the PDCCH transmitted through a PCC among the received CCs according to the implicit resource allocation scheme. The UE may obtain a resource index ($n_{PUCCH,0}$) for allocation of the ACK/NACK resource on the PUCCH through an indicator of a first CCE among CCEs on the PDCCH received through the PCC. Also, the UE may obtain an additional resource index according to the implicit resource allocation scheme. For example, the UE may select any one of the remaining CCEs, excluding the first CCE, among the CCEs on the received PDCCH and obtain an additional resource index ($n_{PUCCH,1}$) from the index of the corresponding CCE.

An ARI (ACK/NACK Resource Indicator) for allocating an ACK/NACK transmission resource is transferred on the PDCCH transmitted through the SCC among the received CCs. As described above, 2 bits allocated to the repeatedly transferred TPC (Transmission Power Control) with respect to the PUCCH may be used for the ARI. The UE may be allocated ACK/NACK transmission resource explicitly through the ARI.

The UE configures a signal transmission table with the resources allocated according to the implicit/explicit resource allocation schemes (S1330).

As described above, the channel selection table is differently configured according to the M value (the number of bits used to transmit an ACK/NACK signal), and the number of resource indexes for configuring the channel selection table differs according to the M value. For example, when the number of indexes of the ACK/NACK transmission resources for configuring the channel selection table is 2, one ACK/NACK transmission resource, which is related to the PDSCH indicated by the PDCCH of a PCC, may be allocated according to the implicit resource allocation scheme and the other remaining ACK/NACK transmission resource, which is related to the PDSCH indicated by the PDCCH of an SSC, may be allocated according the explicit resource allocation scheme by using the ARI.

The UE allocates the ACK/NACK transmission resources in the channel selection table to a first antenna (S1340). The UE allocates a transmission resource, rather than the ACK/NACK transmission resource in the channel selection table, to a second antenna according to the explicit resource allocation scheme (S1350). Accordingly, the transmission resources of the first and second antennas can be prevented from colliding.

The UE transmits the ACK/NACK signal to the first and second antennas by using the allocated ACK/NACK transmission resource (S1360).

Here, the multiple antenna transmission using two antennas is described, but the present invention is not limited thereto and may be applicable to a multiple antenna transmission using two or more antennas.

Table 10 shows an example of a channel selection table in case of M=2.

TABLE 10

| HARQ-ACK(0), HARQ-ACK(1) | $n^{(1)}_{PUCCH}$ | b(0), b(1) |
|---|---|---|
| ACK, ACK | $n^{(1)}_{PUCCH,1}$ | 1, 1 |
| ACK, NACK/DTX | $n^{(1)}_{PUCCH,0}$ | 0, 1 |
| NACK/DTX, ACK | $n^{(1)}_{PUCCH,1}$ | 0, 0 |
| NACK/DTX, NACK | $n^{(1)}_{PUCCH,1}$ | 1, 0 |
| NACK, DTX | $n^{(1)}_{PUCCH,0}$ | 1, 0 |
| DTX, DTX | N/A | N/A |

Table 11 shows an example of a channel selection table in case of M=3.

TABLE 11

| HARQ-ACK(0), HARQ-ACK(1), HARQ-ACK(2) | $n^{(1)}_{PUCCH}$ | b(0), b(1) |
|---|---|---|
| ACK, ACK, ACK | $n^{(1)}_{PUCCH,2}$ | 1, 1 |
| ACK, ACK, NACK/DTX | $n^{(1)}_{PUCCH,1}$ | 1, 1 |
| ACK, NACK/DTX, ACK | $n^{(1)}_{PUCCH,0}$ | 1, 1 |
| ACK, NACK/DTX, NACK/DTX | $n^{(1)}_{PUCCH,0}$ | 0, 1 |
| NACK/DTX, ACK, ACK | $n^{(1)}_{PUCCH,2}$ | 1, 0 |
| NACK/DTX, ACK, NACK/DTX | $n^{(1)}_{PUCCH,1}$ | 0, 0 |
| NACK/DTX, NACK/DTX, ACK | $n^{(1)}_{PUCCH,2}$ | 0, 0 |
| DTX, DTX, NACK | $n^{(1)}_{PUCCH,2}$ | 0, 1 |
| DTX, DTX, NACK/DTX | $n^{(1)}_{PUCCH,1}$ | 1, 0 |
| NACK, NACK/DTX, NACK/DTX | $n^{(1)}_{PUCCH,0}$ | 1, 0 |
| DTX, DTX, DTX | N/A | N/A |

Table 12 shows an example of a channel selection table in case of M=4.

TABLE 12

| HARQ-ACK(0), HARQ-ACK(1), HARQ-ACK(2), HARQ-ACK(3) | $n^{(1)}_{PUCCH}$ | b(0), b(1) |
|---|---|---|
| ACK, ACK, ACK, ACK | $n^{(1)}_{PUCCH,1}$ | 1, 1 |
| ACK, ACK, ACK, NACK/DTX | $n^{(1)}_{PUCCH,1}$ | 1, 0 |
| NACK/DTX, NACK/DTX, NACK, DTX | $n^{(1)}_{PUCCH,2}$ | 1, 1 |
| ACK, ACK, NACK/DTX, ACK | $n^{(1)}_{PUCCH,1}$ | 1, 0 |
| NACK, DTX, DTX, DTX | $n^{(1)}_{PUCCH,0}$ | 1, 0 |
| ACK, ACK, NACK/DTX, NACK/DTX | $n^{(1)}_{PUCCH,1}$ | 1, 0 |
| ACK, NACK/DTX, ACK, ACK | $n^{(1)}_{PUCCH,3}$ | 0, 1 |
| NACK/DTX, NACK/DTX, NACK/DTX, NACK | $n^{(1)}_{PUCCH,3}$ | 1, 1 |
| ACK, NACK/DTX, ACK, NACK/DTX | $n^{(1)}_{PUCCH,2}$ | 0, 1 |
| ACK, NACK/DTX, NACK/DTX, ACK | $n^{(1)}_{PUCCH,0}$ | 0, 1 |
| ACK, NACK/DTX, NACK/DTX, NACK/DTX | $n^{(1)}_{PUCCH,0}$ | 1, 1 |
| NACK/DTX, ACK, ACK, ACK | $n^{(1)}_{PUCCH,3}$ | 0, 1 |
| NACK/DTX, NACK, DTX, DTX | $n^{(1)}_{PUCCH,1}$ | 0, 0 |
| NACK/DTX, ACK, ACK, NACK/DTX | $n^{(1)}_{PUCCH,2}$ | 1, 0 |
| NACK/DTX, ACK, NACK/DTX, ACK | $n^{(1)}_{PUCCH,3}$ | 1, 0 |
| NACK/DTX, ACK, NACK/DTX, NACK/DTX | $n^{(1)}_{PUCCH,1}$ | 0, 1 |
| NACK/DTX, NACK/DTX, ACK, ACK | $n^{(1)}_{PUCCH,3}$ | 0, 1 |
| NACK/DTX, NACK/DTX, ACK, NACK/DTX | $n^{(1)}_{PUCCH,2}$ | 0, 0 |
| NACK/DTX, NACK/DTX, NACK/DTX, ACK | $n^{(1)}_{PUCCH,3}$ | 0, 0 |
| DTX, DTX, DTX, DTX | N/A | N/A |

Here, HARQ-ACK(0)~HARQ-ACK(3) are ACK/NACK types with respect to transport blocks to be determined whether or not they have been normally received (decoded).

$n^{(1)}_{PUCCH}$ is an ACK/NACK transmission resource to be used for transmission. Here, the respective transmission resources, e.g., $\{n^{(1)}_{PUCCH,0}, n^{(1)}_{PUCCH,1}\}$ in case of M=2, $\{n^{(1)}_{PUCCH,0}, n^{(1)}_{PUCCH,1}, n^{(1)}_{PUCCH,2}\}$ in case of M=3, and $\{n^{(1)}_{PUCCH,0}, n^{(1)}_{PUCCH,1}, n^{(1)}_{PUCCH,2}, n^{(1)}_{PUCCH,3}\}$ in case of M=4, constituting the channel selection are the transmission resource, related to the PDSCH indicated by the PDCCH of the PCC, which has been allocated according to the implicit resource allocation scheme and the transmission resource, related to the PDSCH indicated by the PDCCH of the SCC, which has been allocated according to the explicit resource allocation.

b(0)b(1) is a QPSK symbol of an ACK/NACK signal to be transmitted. When the value of b(0),b(1) is mapped to N/A, namely, in case of DTX (Discontinuous Transmission), since it corresponds to, for example, a case in which the UE has not received the PDCCH, so the UE does not transmit an ACK/NACK in a subframe n.

As described above, when the UE allocates resource to the first antenna, by using the signal transmission table, e.g., the channel selection table, the UE transmits the corresponding transmission symbols (b(0), b(1)) on the PUCCH by using the ACK/NACK transmission resource ($n^{(1)}_{PUCCH}$) mapped according to an ACK/NACK type corresponding to the decoding results of the received PDSCHs. For example, in case of M=3, when the types of ACK/NACK signals to be transmitted are all ACK, the UE transmits the value (1, 1) of the corresponding symbols (b(0), b(1)) on the PUCCH by using the ACK/NACK transmission resource $n^{(1)}_{PUCCH,2}$.

The foregoing channel selection table is an example for explaining the technical concept of the present invention, so the present invention is not limited thereto and may be configured in various manners within the scope of the technical concept of the present invention.

Figure 6:
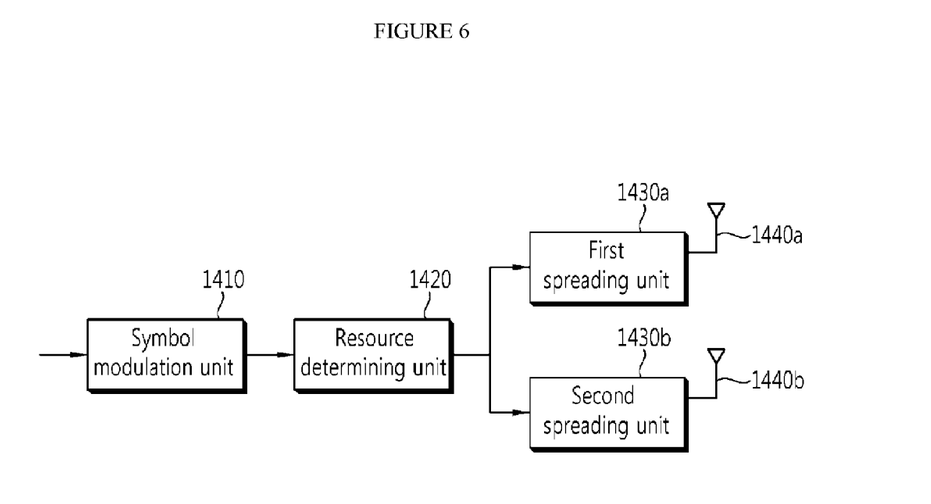
FIG. 6 is a schematic block diagram showing an example of an apparatus for transmitting an HARQ ACK/NACK signal in the multi-antenna system.

FIG. 6 is a schematic block diagram showing an example of an apparatus for transmitting an HARQ ACK/NACK signal in the multi-antenna system. FIG. 6 illustrates multi-antenna transmission using two antennas, but the present invention is not limited thereto, and the present invention may also be applicable to a multi-antenna transmission using two or more antennas. Also, for the sake of brevity, some of a configuration such as an encoder, a mapper, a multiplexing unit, and the like, will be omitted in the following description.

A symbol modulation unit 1410 modulates an ACK/NACK signal and outputs modulation symbols. A resource determining unit 1420 allocates ACK/NACK resource to be used for transmitting the ACK/NACK modulation symbols to a first antenna 1440a and a second antenna 1440b. The results of resource allocation are transmitted, for example, in the form of a resource index, or the like, to first and second spreading units 1430a and 1430b.

The first resource spreading unit 1430a spreads ACK/NACK modulation symbols according to the resource allocation results of the resource determining unit 1420 with respect to the first antenna 1440a and transmits the same through the second antenna 1440b.

When the ACK/NACK signal is transmitted by using multiple antennas, since the same ACK/NACK symbols are transmitted by using different resources through the different antennas, diversity can be obtained.

As described above, the ACK/NACK transmission resource is allocated with respect to the first antenna according to a channel selection table and different resource not mapped in the channel selection table is allocated with respect to the second antenna, and the same ACK/NACK signal is transmitted, whereby a collision of resources is prevented and transmission diversity is obtained.

Figure 7:
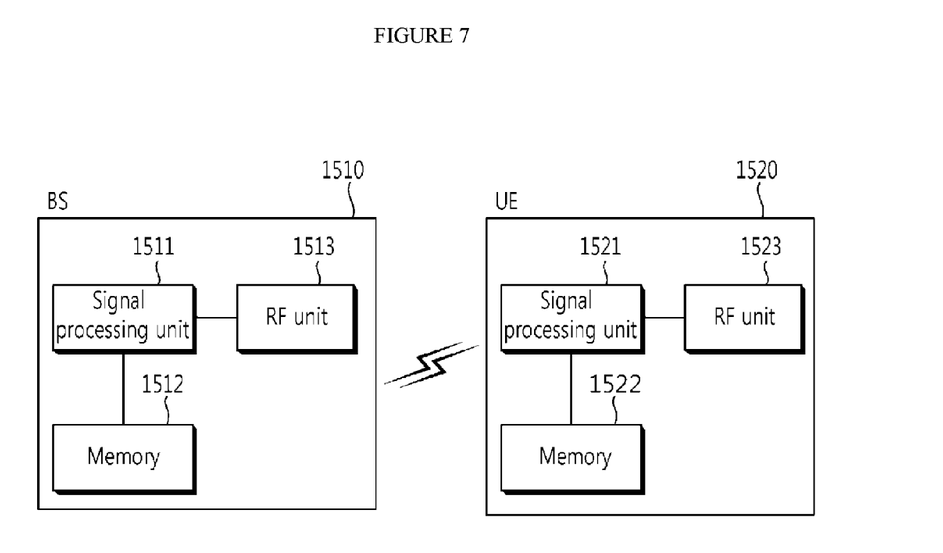
FIG. 7 is a schematic block diagram of a wireless communication system implemented by an embodiment of the present invention.

FIG. 7 is a schematic block diagram of a wireless communication system implemented by an embodiment of the present invention.

A BS 1510 includes a signal processing unit 1511, a memory 1512, and an RF unit 1513.

The signal processing unit 1511 implements the proposed functions, procedures and/or methods. The signal processing unit 1511 may configure a downlink physical channel and perform HARQ. Also, the signal processing unit 1511 may include resource indexes constituting a channel selection table for a resource allocation of an ACK/NACK signal in a downlink transport block or process an ARI, or the like, explicitly indicating the resource indexes. In this case, signal processing is processing in a broad sense including a signal creation, modulation, allocation of signal content, determining of a signal transmission, and the like. For example, how many resource indexes among the resource indexes constituting the channel selection table for an ACK/NACK resource allocation are to be allocated according to an explicit resource allocation scheme, how many resource indexes among the resource indexes constituting the channel selection table are to be allocated according to an implicit resource allocation scheme, which resources are to be based on in order to be allocated resource indexes according to the implicit resource allocation scheme, and the like, may be determined by the signal processing unit 1511 and transmitted to a UE 1520. Also, when a plurality of component carriers are transmitted, the signal processing unit 1511 may transmit an ARI for allocating ACK/NACK transmission resource by using bits allocated to a repeated TPC with respect to the same PUCCH.

The memory 1512, connected to the signal processing unit 1511, stores protocols or parameters for an HARQ operation. Also, the memory 1512 may store the channel selection table and/or the ARI mapping table. The formats of the channel selection table and/or the ARI mapping table are previously determined by a higher layer, so the same formats of channel selection table and/or the ARI mapping table exist in the UE and the BS. The BS 1510 may use the channel selection table and/or the ARI mapping table stored in the memory 1512 in order to process an ACK/NACK signal transmitted from the UE 1520.

The RF unit 1513, connected to the signal processing unit 1511, transmits and/or receives a radio signal, and may include a plurality of antennas.

The UE 1520 may include a signal processing unit 1521, a memory 1522, and an RF unit 1523.

The signal processing unit 1521 implements the proposed functions, procedures and/or methods. The signal processing unit 1521 may obtain a plurality of resources and transmit an HARQ ACK/NACK signal through multiple antennas by using the plurality of resources. Also, the signal processing unit 1521 may also serve to modulate symbols and spread the modulation symbols for an ACK/NACK signal transmission. Also, the signal processing unit 1521 may allocate transmission resource according to an implicit or explicit resource allocation scheme through a radio signal received from the BS. Also, the signal processing unit 1521 may allocate an ACK/NACK transmission resource by using a channel selection table and/or an ARI mapping table and process an ACK/NACK signal.

The memory 1522, connected to the signal processing unit 1521, may store protocols or parameter for an HARQ operation and the same channel selection table and/or ARI mapping table as that of the BS 1510. The RF unit 1523, connected to the signal processing unit 1521, may transmit and/or receive a radio signal, and may include a plurality of antennas.

The signal processing units 1511 and 1521 may include an ASIC (Application-Specific Integrated Circuit), a chip-set, a logical circuit and/or a data processor. The memories 1512 and 1522 may include a ROM (Read-Only Memory), a RAM (Random Access Memory), a flash memory, a memory card, a storage medium, and/or any other storage devices. The RF units 1513 and 1523 may include a baseband circuit for processing a radio signal. When the embodiments are implemented by software, the foregoing techniques may be implemented by modules (processes, functions, or the like) performing the foregoing functions. The modules may be stored in the memories 1512 and 1522 and executed by the signal processing units 1511 and 1521. The memories 1512 and 1522 may be provided within or outside signal processing units 1511 and 1512, respectively, or may be connected to the signal processing units 1511 and 1521 through a well-known unit, respectively.

Control information transferred from a higher layer described in the present disclosure may also be transmitted via a physical control channel, and may be periodically or aperiodically updated according to a request from a BS or a UE or according to a predetermined certain rule or instruction.

In the exemplary system as described above, the methods are described based on the flow chart by sequential steps or blocks, but the present invention is not limited to the order of the steps, and a step may be performed in different order from another step as described above or simultaneously performed. It would be understood by a skilled person in the art that the steps are not exclusive, a different step may be included, or one or more of the steps of the flow chart may be deleted without affecting the scope of the present invention.

The preferred embodiments of the present invention have been described with reference to the accompanying drawings, and it will be apparent to those skilled in the art that various modifications and variations can be made in the present invention without departing from the scope of the invention. Thus, the technical idea of the present invention should be interpreted to embrace all such alterations, modifications, and variations in addition to the accompanying drawings.

What is claimed is:

1. A method for transmitting an acknowledgement/not-acknowledgement (ACK/NACK) by a user equipment (UE), the method comprising:
   configuring a first and second ACK/NACK resource sets based on a Radio Resource Control (RRC) signal;
   receiving, from a base station (BS), an ACK/NACK resource indicator configured to indicate at least two ACK/NACK resources;
   mapping, based on a channel selection, an ACK/NACK associated with a downlink data transmission onto a combination of at least one of the at least two ACK/NACK resources and a modulation symbol; and
   transmitting, to the BS, the ACK/NACK by using the combination,
   wherein if a value of the ACK/NACK resource indicator is '00', the at least two ACK/NACK resources correspond to a first ACK/NACK resource value in the first ACK/NACK resource set and a first ACK/NACK resource value in the second ACK/NACK resource set, respectively;
   is if the value of the ACK/NACK resource indicator is '01', the at least two ACK/NACK resources correspond to a second ACK/NACK resource value in the first ACK/NACK resource set and a second ACK/NACK resource value in the second ACK/NACK resource set, respectively;
   if the value of the ACK/NACK resource indicator is '10', the at least two ACK/NACK resources correspond to a third ACK/NACK resource value in the first ACK/NACK resource set and a third ACK/NACK resource value in the second ACK/NACK resource set, respectively; and
   if the value of the ACK/NACK resource indicator is '11', the at least two ACK/NACK resources correspond to a fourth ACK/NACK resource value in the first ACK/NACK resource set and a fourth ACK/NACK resource value in the second ACK/NACK resource set, respectively.

2. The method of claim 1, wherein the value of the ACK/NACK resource indicator is a 2-bit value of a transmission power control field (TPC), included in downlink control information (DCI) indicating the downlink data transmission on a secondary component carrier (SCC).

3. The method of claim 1, wherein both of the first ACK/NACK resource set and the second ACK/NACK resource set include four ACK/NACK resource values which are configured by a higher layer signaling.

4. The method of claim 2, wherein at least one of the at least two ACK/NACK resources is associated with a physical uplink control channel (PUCCH) of a primary component carrier (PCC), and
   wherein the DCI is included in a physical downlink control channel (PDCCH) of the SCC distinct from a PDCCH of the PCC.

5. The method of claim 2, wherein if the downlink data transmission is for one transport block, the TPC field is configured to be used to indicate a single ACK/NACK resource which is included in the first ACK/NACK resource set.

6. The method of claim 2, wherein if the downlink data transmission is for two transport blocks, the TPC field is configured to be used to indicate 2 ACK/NACK resources which are included in the first ACK/NACK resource set and the second ACK/NACK resource set, respectively.

7. A user equipment (UE) to transmit an acknowledgement/not-acknowledgement (ACK/NACK), the UE comprising:
   a processor to configure a first and second ACK/NACK resource sets based on a Radio Resource Control (RRC) signal; and
   a transceiver to receive, from a base station (BS), an ACK/NACK resource indicator configured to indicate at least two ACK/NACK resources,
   wherein the processor is configured to map, based on a channel selection, an ACK/NACK associated with a downlink data transmission onto a combination of at least one of the at least two ACK/NACK resources and a modulation symbol,
   wherein the transceiver transmits, to the BS, the ACK/NACK by using the combination, and
   wherein if a value of the ACK/NACK resource indicator is '00', the at least two ACK/NACK resources correspond to a first ACK/NACK resource value in the first ACK/NACK resource set and a first ACK/NACK resource value in the second ACK/NACK resource set, respectively;

if the value of the ACK/NACK resource indicator is '01', the at least two ACK/NACK resources correspond to a second ACK/NACK resource value in the first ACK/NACK resource set and a second ACK/NACK resource value in the second ACK/NACK resource set, respectively;

if the value of the ACK/NACK resource indicator is '10', the at least two ACK/NACK resources correspond to a third ACK/NACK resource value in the first ACK/NACK resource set and a third ACK/NACK resource value in the second ACK/NACK resource set, respectively; and if the value of the ACK/NACK resource indicator is '11', the at least two ACK/NACK resources correspond to a fourth ACK/NACK resource value in the first ACK/NACK resource set and a fourth ACK/NACK resource value in the second ACK/NACK resource set, respectively.

8. The UE of claim 7, wherein the value of the ACK/NACK resource indicator is a 2-bit value of a transmission power control field (TPC), included in downlink control information (DCI) indicating the downlink data transmission on a secondary component carrier (SCC).

9. The UE of claim 7, wherein both of the first ACK/NACK resource set and the second ACK/NACK resource set include four ACK/NACK resource values which are configured by a higher layer signaling.

10. The UE of claim 8, wherein at least one of the at least two ACK/NACK resources is associated with a physical uplink control channel (PUCCH) of a primary component carrier (PCC), and wherein the DCI is included in a physical downlink control channel (PDCCH) of the SCC distinct from a PDCCH of the PCC.

11. The UE of claim 8, wherein if the downlink data transmission is for one transport block, the TPC field is configured to be used to indicate a single ACK/NACK resource which is included in the first ACK/NACK resource set.

12. The UE of claim 8, wherein if the downlink data transmission is for two transport blocks, the TPC field is configured to be used to indicate 2 ACK/NACK resources which are included in the first ACK/NACK resource set and the second ACK/NACK resource set respectively.

13. A method for receiving an acknowledgement/not-acknowledgement (ACK/NACK) by a base station (BS), the method comprising:

transmitting, to a user equipment (UE), an ACK/NACK resource indicator configured to indicate at least two ACK/NACK resources from among at least one ACK/NACK resource set configured by Radio Resource Control (RRC);

receiving, from the UE, an ACK/NACK associated with a downlink data transmission performed from the BS to the UE, wherein if a value of the ACK/NACK resource indicator is '00', the at least two ACK/NACK resources correspond to a first ACK/NACK resource value in the first ACK/NACK resource set and a first ACK/NACK resource value in the second ACK/NACK resource set, respectively;

if the value of the ACK/NACK resource indicator is '01', the at least two ACK/NACK resources correspond to a second ACK/NACK resource value in the first ACK/NACK resource set and a second ACK/NACK resource value in the second ACK/NACK resource set, respectively;

if the value of the ACK/NACK resource indicator is '10', the at least two ACK/NACK resources correspond to a third ACK/NACK resource value in the first ACK/NACK resource set and a third ACK/NACK resource value in the second ACK/NACK resource set, respectively; and if the value of the ACK/NACK resource indicator is '11', the at least two ACK/NACK resources correspond to a fourth ACK/NACK resource value in the first ACK/NACK resource set and a fourth ACK/NACK resource value in the second ACK/NACK resource set, respectively; and wherein the ACK/NACK is received by using a combination of at least one of the at least two ACK/NACK resources and a modulation symbol, the ACK/NACK being mapped, based on a channel selection, onto the combination.

14. The method of claim 13, wherein the value of the ACK/NACK resource indicator is a 2-bit value of a transmission power control field (TPC), included in downlink control information (DCI) indicating the downlink data transmission on a secondary component carrier (SCC).

15. The method of claim 13, wherein both of the first ACK/NACK resource set and the second ACK/NACK resource set include four ACK/NACK resource values which are configured by a higher layer signaling.

16. The method of claim 14, wherein at least one of the at least two ACK/NACK resources is associated with a physical uplink control channel (PUCCH) of a primary component carrier (PCC), and wherein the DCI is included in a physical downlink control channel (PDCCH) of the SCC distinct from a PDCCH of the PCC.

17. The method of claim 14, wherein if the downlink data transmission is for one transport block, the TPC field is configured to be used to indicate a single ACK/NACK resource which is included in the first ACK/NACK resource set.

18. The method of claim 14, wherein if the downlink data transmission is for two transport blocks, the TPC field is configured to be used to indicate 2 ACK/NACK resources which are included in the first ACK/NACK resource set and the second ACK/NACK resource set, respectively.

* * * * *